(12) United States Patent
Harris et al.

(10) Patent No.: US 10,783,533 B2
(45) Date of Patent: Sep. 22, 2020

(54) SYSTEM FOR IDENTIFICATION AND RESOLUTION OF OPPORTUNITY TRIGGERS

(71) Applicant: Coupa Software Incorporated, San Mateo, CA (US)

(72) Inventors: Scott Harris, San Mateo, CA (US); Yao Yao, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 1008 days.

(21) Appl. No.: 15/169,499

(22) Filed: May 31, 2016

(65) Prior Publication Data
US 2017/0345028 A1 Nov. 30, 2017

(51) Int. Cl.
*G06Q 30/02* (2012.01)
*G06Q 10/08* (2012.01)

(52) U.S. Cl.
CPC ....... *G06Q 30/0201* (2013.01); *G06Q 10/087* (2013.01)

(58) Field of Classification Search
CPC ............. G06Q 30/0201; G06Q 30/02
(Continued)

(56) References Cited

U.S. PATENT DOCUMENTS

| | | | | |
|---|---|---|---|---|
| 2003/0212604 A1* | 11/2003 | Cullen, III | ............. | G06Q 30/02 705/26.35 |
| 2003/0233286 A1* | 12/2003 | Hahn-Carlson | .... | G06Q 30/0283 705/317 |

(Continued)

Primary Examiner — Vincent M Cao

(74) *Attorney, Agent, or Firm* — Hickman Palermo Becker Bingham LLP; Christine E. Orich

(57) ABSTRACT

A data processing method comprises storing, in one or more data repositories, information on a plurality of supplier entities according to a supplier ontology including for each particular supplier entity at least three different supplier attributes comprising a supplier detail, a timestamp specifying at least one of when the supplier detail expires or when the supplier detail was last updated, and an electronic identifier usable to contact the particular supplier entity; using supplier trigger monitoring instructions of a procurement system executed on a server computer that is coupled to the one or more data repositories, storing a plurality of opportunity triggers each comprising a trigger type and a numeric value; monitoring, without receiving an explicit request from a computing device, and based at least in part on information from the one or more data repositories, whether one or more of the plurality of opportunity triggers is satisfied, in response to determining, for a particular opportunity trigger and a particular supplier entity, that a timestamp associated with a particular supplier detail that is identified in the opportunity trigger exceeds a time that is determined at least in part by the numeric value associated with that particular opportunity trigger; creating, based on the monitoring, a first set of triggered opportunity triggers comprising at least one satisfied opportunity trigger; causing displaying, on a computing device, a graphical interface that depicts the first set of triggered opportunity triggers, including a first triggered opportunity trigger indicating that a first supplier entity has satisfied an opportunity trigger, and a supplier name for the first supplier entity, and a control that is associated with an executable component of the procurement system that can be initiated to remedy the first triggered opportunity trigger based on a first trigger type of the first triggered opportunity trigger; receiving a selection of the control and automatically initiating execution of the executable component of the procurement system; under control of the executable component, transmitting a first electronic message to resolve the first triggered opportunity trigger.

23 Claims, 8 Drawing Sheets

(58) Field of Classification Search
USPC .......................................................... 705/7.29
See application file for complete search history.

(56) References Cited

U.S. PATENT DOCUMENTS

| | | | | |
|---|---|---|---|---|
| 2005/0177435 | A1* | 8/2005 | Lidow | G06Q 10/08 |
| | | | | 705/22 |
| 2006/0009999 | A1* | 1/2006 | Gee | G06Q 10/06 |
| | | | | 705/26.25 |
| 2009/0132333 | A1* | 5/2009 | Sheffer | G06Q 10/06315 |
| | | | | 705/7.25 |
| 2010/0106652 | A1* | 4/2010 | Sandholm | G06Q 10/04 |
| | | | | 705/80 |
| 2011/0258083 | A1* | 10/2011 | Ren | G06Q 30/0641 |
| | | | | 705/27.1 |
| 2012/0084366 | A1* | 4/2012 | Killoran, Jr. | G06Q 10/063112 |
| | | | | 709/206 |
| 2013/0173464 | A1* | 7/2013 | Quillian | G06Q 30/06 |
| | | | | 705/40 |
| 2014/0095221 | A1* | 4/2014 | Lore | G06Q 30/06 |
| | | | | 705/5 |
| 2014/0278705 | A1* | 9/2014 | Tuggle | G06Q 10/0631 |
| | | | | 705/7.23 |
| 2014/0304130 | A1* | 10/2014 | Winters | G06Q 30/0255 |
| | | | | 705/35 |
| 2015/0188875 | A1* | 7/2015 | Sharp | H04L 51/36 |
| | | | | 715/752 |

* cited by examiner

US 10,783,533 B2

SYSTEM FOR IDENTIFICATION AND RESOLUTION OF OPPORTUNITY TRIGGERS

TECHNICAL FIELD

The present disclosure generally relates to computer-implemented systems and techniques for processing digital data input that is received from different sources to identify and resolve triggers to perform other actions in a computerized system or application. SUGGESTED GROUP ART UNIT: 2195; SUGGESTED CLASSIFICATION: 718/106.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Arranging purchases of goods or services is a common task in business enterprises, and large companies often use a computer-based procurement system to manage creating, reviewing, approving, and communicating requests to purchase items in coordination with suppliers or vendors. The computer-based procurement system may include many details of information for each supplier. Some of these supplier details may be associated with various expiration times, become stale over time, or contain inaccuracies simply because of prolonged lack of updating.

For example, a buyer using a procurement system may have many supplier entities, with each supplier entity providing many details to complete transactions. As part of these details, a supplier entity may be required to produce a certificate or other document to verify that what they supply meets the requirements of the buyer. This may be stored by the procurement system. However, the certificate may be time limited, so that after a time period specified by the certificate, the certificate expires and a new certificate is required. If the buyer were to purchase product from the supplier, while the supplier's certificate was expired, this may mean that if a commodity received by the buyer does not meet standards, the buyer would be unable to pursue remedies to correct the commodity's quality.

As another example, if a supplier has not been active in the procurement system for an extended period of time, this may indicate that the supplier needs to verify or update existing information stored by the procurement system. To be inactive in the procurement system may mean that a user associated with the supplier entity has not logged onto the procurement system for a certain amount of time or that no orders or transactions have been made between the buyer and the supplier entity recently.

DETAILED DESCRIPTION

Figure 1:
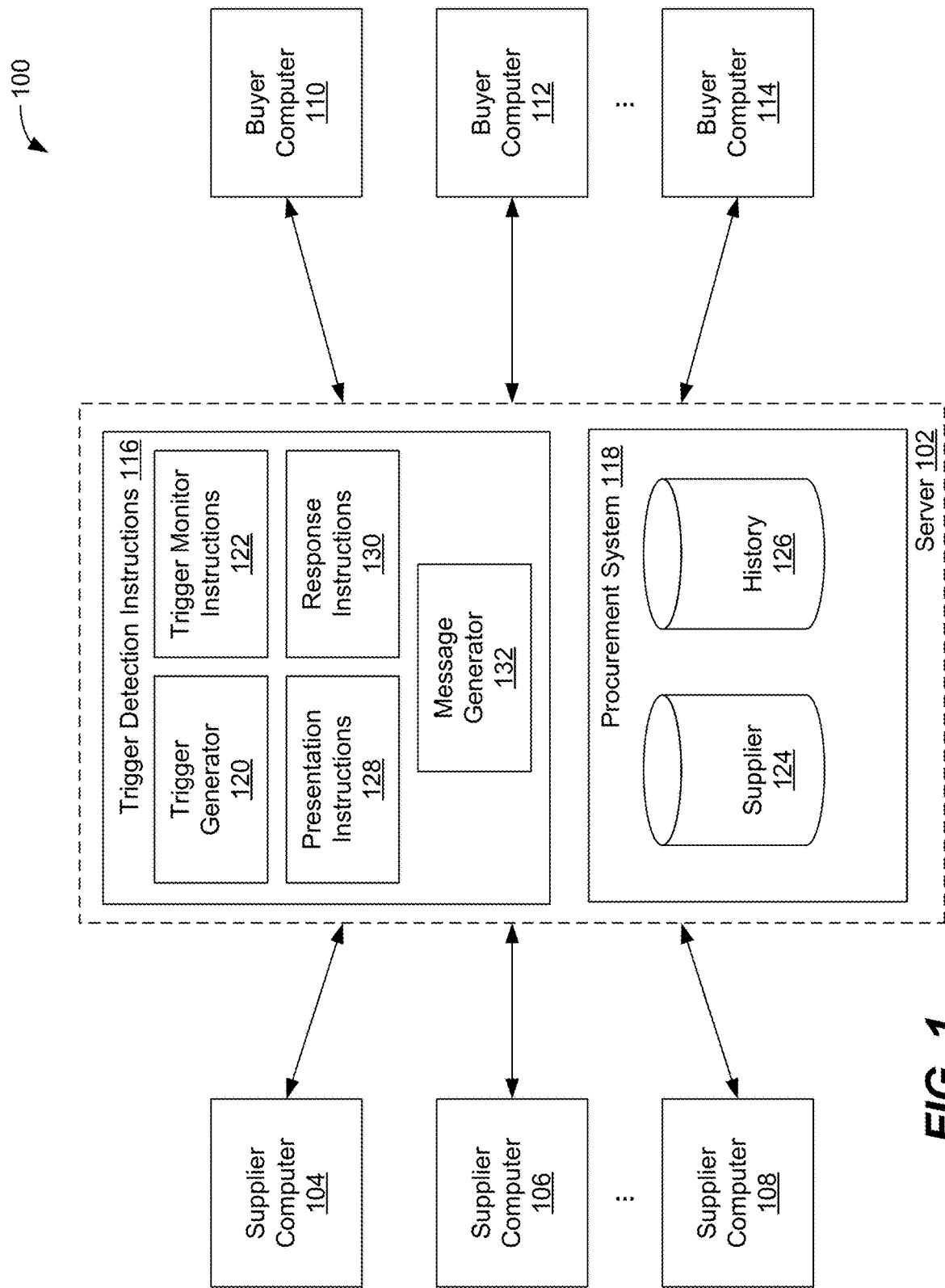
FIG. 1 depicts a block diagram of computer systems in an embodiment of a trigger detection system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Certain embodiments are described in the context of working with a trigger detection system executing on a server computer. However, it is understood that a server is only a specific type of system, of which there are others, which may host or support the trigger detection system. For example, the same principles as discussed in this application would be applicable to alternative systems where the trigger detection system executes on one or more computing devices that may simultaneously execute computing instructions for additional systems. An example is a procurement computer system.

Embodiments are described in sections below according to the following outline:
 1.0 GENERAL OVERVIEW
 2.0 STRUCTURAL OVERVIEW
 3.0 EXAMPLE METHOD FOR A TRIGGER DETECTION SYSTEM
  3.1 DEFINING SUPPLIER DETAILS
  3.2 CONFIGURING OF OPPORTUNITY TRIGGERS
  3.3 MONITORING OF OPPORTUNITY TRIGGERS
  3.4 GENERATING DISPLAY OF TRIGGERED OPPORTUNITY TRIGGERS
  3.5 RESPONDING TO CONTROLS
 4. EXAMPLE IMPLEMENTATION OF A TRIGGER DETECTION SYSTEM USING A USER INTERFACE
 5. IMPLEMENTATION EXAMPLE—HARDWARE OVERVIEW 1.0 General Overview Computer-implemented systems and methods described herein are programmed or configured to maintain and update supplier details stored by an electronic procurement system in a manner more efficient and streamlined than in prior approaches. In general, computer-implemented systems and techniques are provided for processing digital data input that is received from different sources to identify and resolve triggers to perform other actions in a computerized system or application. As an example, while a computer program is engaged in performing a first function, the program automatically determines that a state of stored data has triggered an update condition, and the program automatically generates and causes displaying a prompt to perform an update to the stored data, including providing a hyperlink or other access mechanism for accessing a specific other functional area of the program that can operate to perform the triggered update. In one specific embodiment, an electronic procurement system includes multiple data details about supplier entities that are necessary to complete a transaction or order with a buyer entity. Once the supplier details are stored in the electronic procurement system, these details may be used in a current transaction or future transactions.

A trigger detection system avoids the consumption of unnecessary resources such as network bandwidth, memory and storage that would otherwise be required to manually detect, process, and propagate messages to ensure that supplier details are accurate. In one approach, the trigger detection system identifies errors or omissions in the supplier details and performs functions to require an update before a transaction or order occurs. The trigger detection system may be programmed or configured to generate a graphical user interface that identifies triggered conditions related to supplier details. In an embodiment, the trigger detection system also provides specific controls, such as access links, in the graphical user interface which when selected or use permit resolving the conditions. Therefore, the trigger detection system reduces wasted CPU cycles, memory space, network bandwidth and other resources by ensuring that supplier details stored by the procurement system are valid and/or updated at the time that a transaction is attempted, and without requiring separate messaging, such as reminders and the like, outside the system. This avoids wasted computing resources involved in initiating payables records or generating payments that cannot be completed because one or more supplier details are incomplete or invalid. Moreover, by virtue of having complete and updated information about vendors, the procurement system operates more efficiently and uses less bandwidth.

In an embodiment, the trigger detection system comprises a computer implemented method for storing, in one or more data repositories, information on a plurality of supplier entities according to a supplier ontology including for each particular supplier entity at least three different supplier attributes comprising a supplier detail, a timestamp specifying at least one of when the supplier detail expires or when the supplier detail was last updated, and an electronic identifier usable to contact the particular supplier entity. For example, the information for the plurality of suppliers may be stored by a procurement system, whose information the trigger detection system may access. The trigger detection system may be built into the same software as the procurement system, or may be a separately executing instance of software from the procurement system that has access to the information on supplier entities stored by the procurement system. The supplier ontology defines how various supplier details are stored by the procurement system in a way that is accessible and usable by the trigger detection system. For example, if a supplier detail is an order history for an associated supplier, the procurement system may need to retrieve information on the most recent order. The supplier ontology defines how supplier details are stored, so that the trigger detection system may understand what the supplier details relates to (for example, most recent order), associated information of the supplier detail (for example, commodity supplied, cost of commodity, or many other details), and a timestamp for the information. The timestamp associated with the most recent order may be when the order was placed in the procurement system, when a commodity was shipped according to the order, when the order was approved by the buyer and supplier entities, or any other date associated with the order. The electronic identifier may be any electronic identifier that allows a message to be transmitted to the supplier entity. Some examples of these include an email address, an instant messaging account, an internal messaging system identifier, or any other type of identifier.

The computer implemented method may further include using supplier trigger monitoring instructions of the procurement system executed on a server computer that is coupled to the one or more data repositories, storing a plurality of opportunity triggers each opportunity trigger comprising a trigger type and a numeric value. Each opportunity trigger may be established by a buyer entity using the trigger detection system or the procurement system. There may be different trigger types available, depending on the supplier detail the opportunity trigger is directed towards.

The computer implemented method also includes monitoring, without receiving an explicit request from a computing device, and based at least in part on information from the one or more data repositories, whether one or more of the plurality of opportunity triggers is satisfied. To satisfy an opportunity trigger means to determine, for a particular opportunity trigger and a particular supplier entity, that a timestamp associated with a particular supplier detail that is identified in the particular opportunity trigger exceeds a time that is determined at least in part by the numeric value associated with that particular opportunity trigger (for example, a number of days before or after a timestamp for the particular supplier detail). Using the triggered opportunity triggers, a first set of triggered opportunity triggers is created.

The computer implemented method may further cause displaying, on a computing device, a graphical interface that depicts the first set of triggered opportunity triggers, including a first triggered opportunity trigger indicating that a first supplier entity has satisfied an opportunity trigger, a supplier name for the first supplier entity, and a control that is associated with an executable component of the procurement system that can be initiated to remedy the first triggered opportunity trigger. Controls included with each triggered opportunity trigger may be dependent on its associated opportunity trigger (for example, the opportunity trigger's type).

The computer implemented method may further receive a selection of the control and automatically initiating execution of the executable component of the procurement system. For example, the trigger detection system may pass a command or request based on the selected control to the procurement system, to allow remedying of the triggered opportunity trigger. This may include transmitting a first electronic message to resolve the first triggered opportunity trigger.

2.0 Structural Overview

FIG. 1 depicts a block diagram of computer systems that may be used in an embodiment of a trigger detection system 100. In an embodiment, a trigger detection system 100 comprises trigger detection instructions 116 executing on a server computer 102. The server 102 may also be executing additional code, such as code for a procurement system 118. Although the trigger detection instructions 116 are shown in FIG. 1 as executing on the server 102 separately from the procurement system 118, the trigger detection instructions 116 may be a part of computer instructions installed as part of the procurement system 118, as a module or a plug-in to supplement features of the procurement system 118, as a separate instance of executing code on the server 102 than an instance of code of the procurement system 118, or any other arrangement depending on the needs of a buyer entity.

Further, although only a single server 102 is shown in FIG. 1, the trigger detection instructions and the procurement system 118 may be executing on additional computing devices not shown in the figure. For example, the trigger detection instructions 116 may execute on a first computing device and the procurement system 118 may execute on a second computing device. This may allow a single instance of trigger detection instructions to monitor one or more procurement system instances, each executing on different computing devices, without requiring multiple instances of the trigger detection instructions 116 to be executing on different computing devices to conserve resources.

The procurement system 118 may include a supplier data source 124 and a history data source 126 managed by the procurement system 118. The supplier data source 124 may include information on one or more supplier entities as well associated details on the supplier entities. The history data source 126 includes, for each supplier entity, one or more records of orders or transactions between the buyer entity and a respective supplier entity.

Additional computing elements, code or other functional elements that are not shown in FIG. 1 may be provided by the procurement system 118. For example, the procurement system 118 may comprise code for a supplier information management (SIM) system. The SIM system may include features to communicate with an accounts payable computer at a buyer and an accounts receivable computer at a supplier to generate, validate, and process invoices. When an accounts receivable computer communicates with the SIM system to initiate a task such as invoice generation, the SIM system checks that supplier details from a supplier profile are complete and updated. The supplier profile information may comprise various supplier details stored in the supplier data source 124. The procurement system 118 may also provide functionality to receive, from the trigger detection instructions 116, one or more supplier details to update based on triggered opportunity triggers.

The server 102 is accessible over a network by multiple computing devices, such as supplier computer 104, supplier computer 106, supplier computer 108, buyer computer 110, buyer computer 112, and buyer computer 114. Although there are three supplier computers and three buyer computers shown in FIG. 1, any other number of supplier or buyer computers may be registered with the server 102 at any given time. Thus, the elements in FIG. 1 are intended to represent one workable embodiment but are not intended to constrain or limit the number of elements that could be used in other embodiments. In an embodiment, the buyer computer 110, buyer computer 112, and buyer computer 114 may be restricted to only buyers from a single buying entity. In other words, although more than one buyer computer may be used, only verified users of a single buying entity may access information stored in the procurement system 118 from these computers. Any applicable means of restricting unauthorized users from accessing the procurement system 118 may be used (for example, password and username, two-step authentication, or other means). Further, each of the supplier computer 104, supplier computer 106, and supplier computer 108 may correspond to one or more supplier entities. For example, the procurement system 118 is accessible by more than one supplier entity, because a buyer entity may choose to source from more than one supplier entity for one or more commodities. Different supplier entities may access the procurement system 118 concurrently or at different times, although information on one supplier entity may be hidden or inaccessible from other supplier entities.

Figure 3:
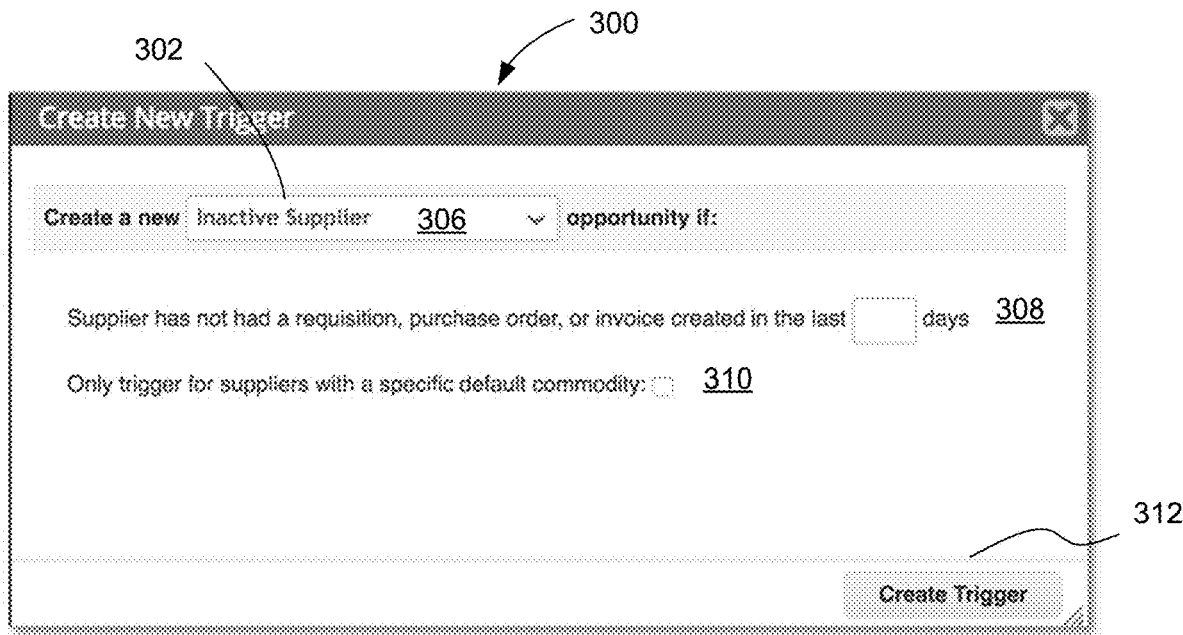
FIG. 3 depicts a display to input details to create an opportunity trigger of an "inactive supplier" type.
Figure 4:
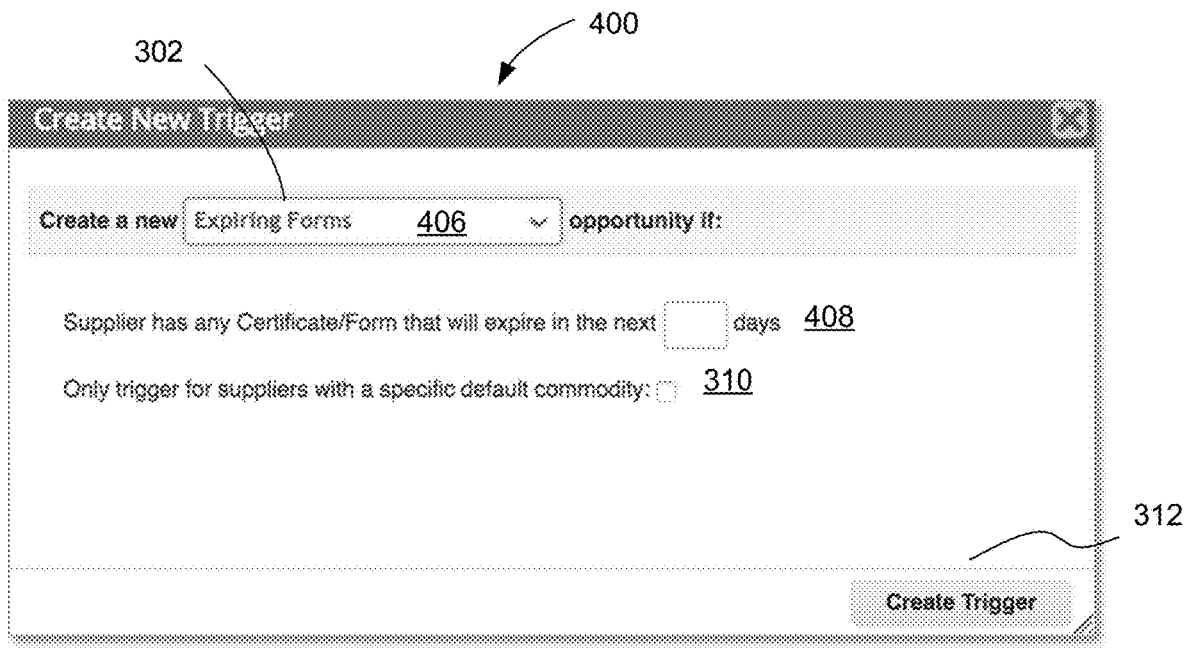
FIG. 4 depicts a display to input details to create an opportunity trigger of an "expiring forms" type.
Figure 5:
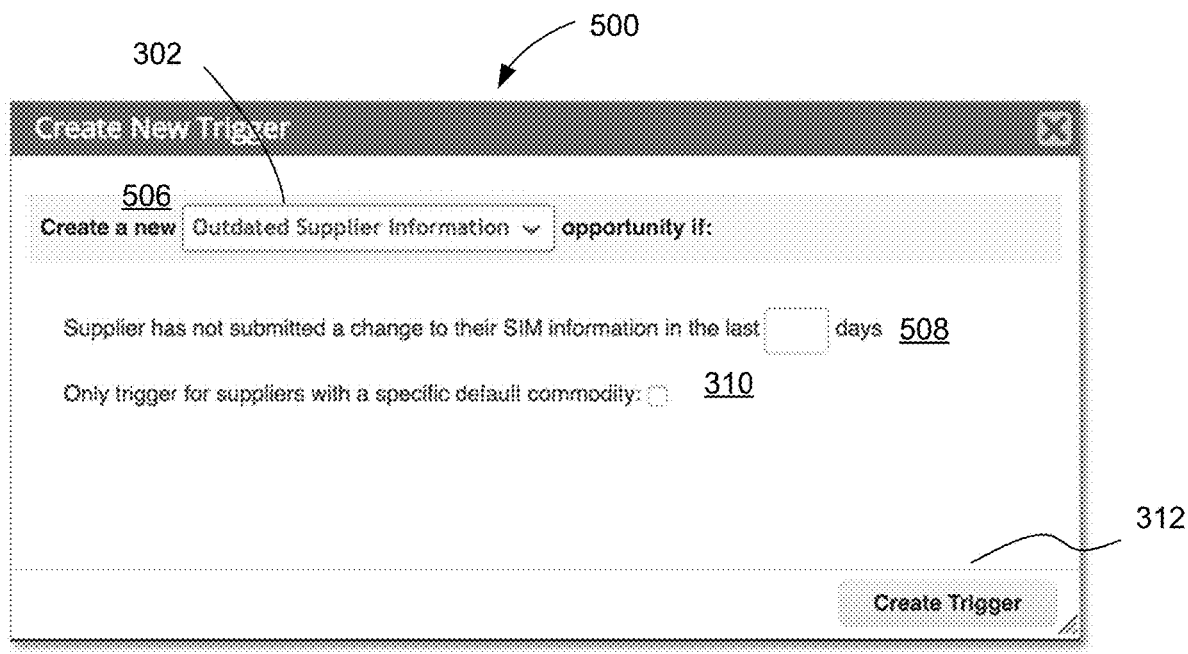
FIG. 5 depicts a display to input details to create an opportunity trigger of an "outdated supplier information" type.

The trigger detection instructions 116 include various features: a trigger generator 120, trigger monitor instructions 122, presentation instructions 128, response instructions 130, and a message generator 132. The trigger generator 120 is responsible for receiving information from the buyer computer 110, buyer computer 112, or buyer computer 114 and generating an appropriate opportunity trigger. Some examples of information that may be collected by the trigger generator 120 are shown in FIG. 3, FIG. 4, and FIG. 5.

The trigger monitor instructions 122 are responsible for receiving generated opportunity triggers from the trigger generator 120 and monitoring whether the generated opportunity triggers are satisfied. For example, the trigger monitor instructions 122 include features to access information from the supplier data source 124 and the history data source 126 managed by the procurement system 118.

The response instructions 130 include features to identify what an appropriate response to a triggered opportunity trigger should be. For example, based on what opportunity type is triggered, different controls may be provided to remedy the triggered opportunity trigger. The message generator 132 includes a method, responsive to selection of a control generated by the response instructions 130, to remedy the triggered opportunity trigger.

3.0 Example Method for a Trigger Detection System

Figure 2:
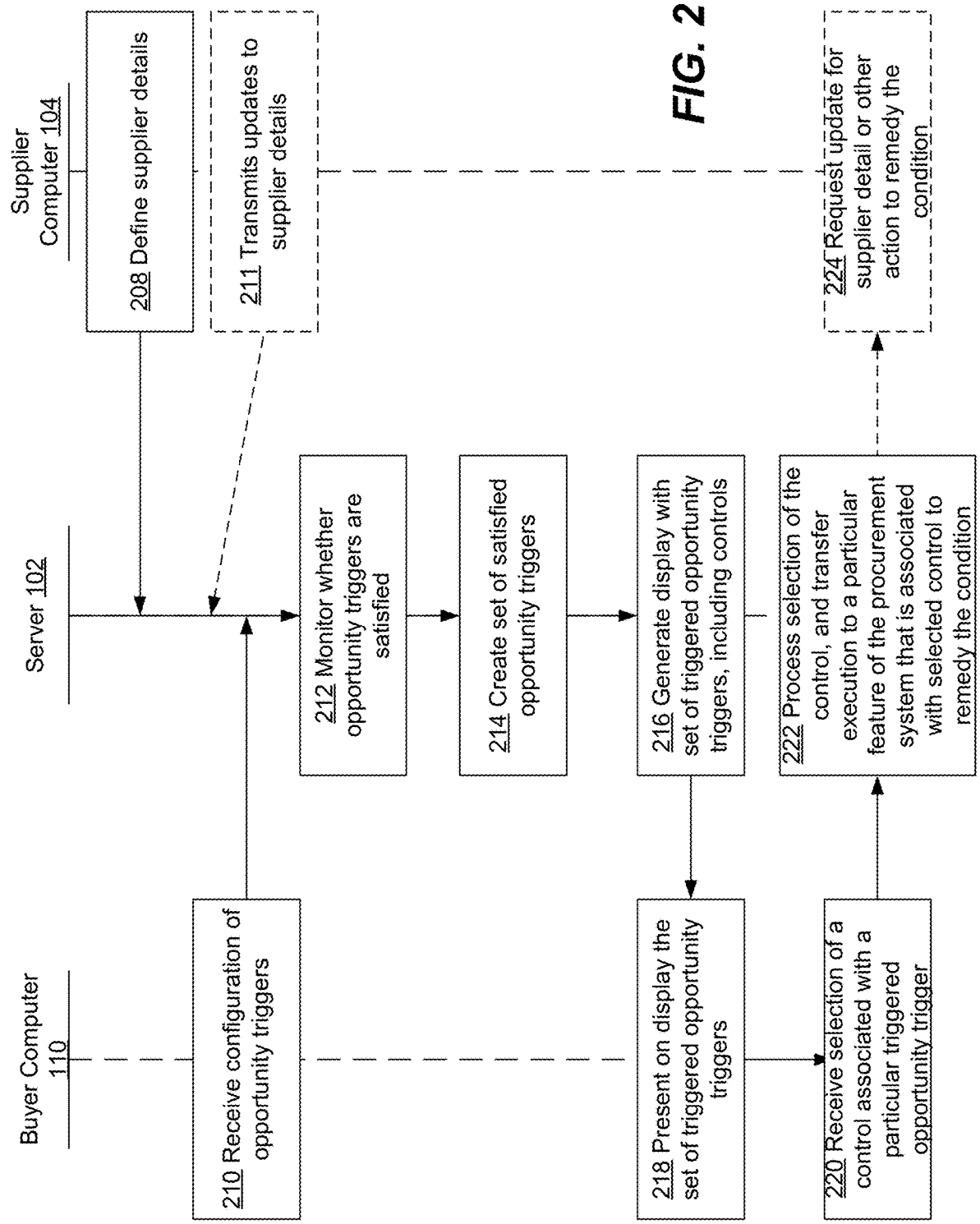
FIG. 2 is a time chart for a method performing trigger detection in a trigger detection system.

FIG. 2 is a time chart that illustrates an example method of performing trigger detection in a trigger detection system 100.

For purposes of illustrating a clear example, FIG. 1 is described herein in the context of FIG. 1, but the broad principles of FIG. 2 can be applied to other systems having configurations other than as shown in FIG. 1. Further, FIG. 2 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

The time chart of FIG. 2 depicts tasks performed by different computers as shown in FIG. 1, including the buyer computer 110, the server 102, and the supplier computer 104.

3.1 Defining Supplier Details

Starting with step 208, in an embodiment, supplier computer 104 defines supplier details and transmits them to the server 102. For example, as part of a registration process with the procurement system 118, a supplier entity creates an account profile and provides details to satisfy an invoice, order, or other transaction facilitated by the procurement system 118. Some examples of supplier details include electronic contact information of the supplier entity, supplier entity name, address, tax identifier, payment terms, invoice format, and the like. In various embodiments, the server 102 may identify certain pieces of required details from the supplier entity, before the supplier entity profile may be deemed complete. Examples include payment remittance information or a federal employer identification number (EIN). Payment remittance information can include a variety of payment options such as a remit to address, wire instructions, or credit card payment instructions.

In an embodiment, the profile definition may specify one or more required documents or certifications to be uploaded to the server 102 from the supplier entity, such as tax or insurance documents. For example, some suppliers of commodities may provide warranty information as part of their profile details or insurance information as part of profile details. A further subset of vendors who provide both goods and services may provide warranty information as well as insurance information.

In an embodiment, the supplier entity using supplier computer 104 does not directly provide all its information directly into the procurement system 118. The supplier entity may provide some of the information (for example, an account setup) but will rely on the buyer entity to provide additional supplier details. For example, the procurement system 118 may populate information on the supplier entity based on printed documents, manual entry by the buyer entity, or using other methods.

In optional step 211, the supplier computer 104 receives updates to supplier details and transmits these updates to the server 102. For example, after setting up an initial account profile, the supplier entity's details may change. The supplier entity may proactively choose to provide these updated details to the procurement system, without prompting by the procurement system. For example, the supplier entity may move from one location to another, change their company name, receive new certificates or forms relevant to their specific commodity, or make other changes to their details as supplied in step 210.

3.2 Configuring Opportunity Triggers

In step 210, the buyer computer 110 receives configuration of opportunity triggers from a buyer entity and transmits the configuration to the server 102.

In an embodiment, there are two different pieces of information needed to create an opportunity trigger: an opportunity trigger type and a numerical value. The opportunity trigger type may define how the numerical value is used by the trigger detection system 100. Opportunity trigger types are discussed elsewhere in this application, however as an example, if the opportunity trigger type is an "inactive supplier" type, the numerical value associated will be used to check whether any of the supplier entities associated with the buyer entity have not had a requisition, purchase order, or invoice created within the number of days specified by the numerical value.

In various embodiments, opportunity triggers may also indicate whether the opportunity trigger applies to all supplier entities or a subset of the supplier entities stored in the procurement system 118. For example, for each commodity there is a default supplier for the commodity. This may mean that the default supplier provides a bulk of a certain commodity or may be the only supplier entity for a certain commodity. Since these default suppliers are relied upon more than other non-default suppliers, opportunity triggers may be generated specifically to check these critical default supplier entities without checking all the supplier entities in the procurement system 118. This assists the trigger detection system 100 in reducing the number of triggered opportunity triggers, since only a subset of supplier entities need to be monitored.

3.3 Monitoring Opportunity Triggers

In step 212, the trigger detection system 100 monitors whether opportunity triggers have been satisfied. For example, features implemented by the trigger detection instructions 116 access information provided by the procurement system 118. Using the information from the procurement system 118, the trigger detection instructions 116 includes comparison features to determine whether one or more opportunity triggers have been satisfied.

In an embodiment, the trigger detection system 100 monitors whether opportunity triggers have been satisfied using polling methods. For example, the trigger detection system 100 may select a certain time of day or a frequency in number of days which, when the time has been reached, automatically determine whether an opportunity trigger has been satisfied, without input from the buyer entity or the supplier entity. Other embodiments may use different methods to determine when to check whether an opportunity trigger is satisfied, such as checking when a buyer entity logs onto the trigger detection system 100 or the procurement system 118.

In step 214, the server 102 creates a set of triggered opportunity triggers. These triggered opportunity triggers may be stored in a queue data structure so that they are ready for presentation upon request by the buyer computer 110.

In an embodiment, an opportunity trigger may result in more than one triggered opportunity trigger. This means that opportunity triggers are generally supplier-agnostic, since a single opportunity trigger may apply to more than one supplier entity. For example, each triggered opportunity trigger may be supplier specific, so that a single opportunity trigger may result in a first triggered opportunity trigger for a first supplier and a second triggered opportunity for a second supplier.

In various embodiments, a supplier entity may satisfy more than one opportunity trigger. For example, a supplier entity may have an expiring form associated with them ("expiring form" trigger type) and outdated supplier information associated with them in the procurement system ("outdated SIM data" trigger type). This may mean that different supplier details associated with the supplier entity are potentially problematic. If a supplier entity satisfies more than one opportunity trigger, this may provide a strong indication that the supplier entity should not be used for further orders of transactions in the procurement system 118 until the issues are remedied.

3.4 Generating Display of Triggered Opportunity Triggers

In step 216, the trigger detection system 100 generates a display with the set of triggered opportunity triggers, including controls. These may be the triggered opportunity triggers stored in a queue data structure as identified in step 214. For each of the triggered opportunity trigger at least one control is included. The control may be dependent on the opportunity trigger type. For example, for the "inactive supplier" type, the control may allow a user to deactivate a supplier entity in the procurement system 118. When a supplier entity is deactivated in the procurement system 118, the supplier entity may not be used for further orders until the issue that caused the supplier to become deactivated is remedied.

In step 218, the trigger detection system 100 presents the display on a screen of the buyer computer 110 with the set of triggered opportunity triggers.

3.5 Responding to Controls

In step 220, the trigger detection system 100 receives selection of a control associated with a particular triggered opportunity trigger and transmits the information to the server 102. For example, on a display screen of the buyer computer 110, a control is represented as a hyperlink. The hyperlink, when selected, indicates that the corresponding control has been selected and the appropriate steps to remedy the triggered opportunity trigger may begin.

In step 222, the trigger detection system 100 processes selection of the control at the server 102, by transferring program execution to a particular feature of the procurement system 118 that is associated with selected control and that can rectify the condition. Depending on the type of the opportunity trigger, step 222 may comprise transferring control to objects, methods, programs or pages that are configured or programmed for modifying one or more supplier details or transmitting a message to the supplier entity to update their information in the procurement system 118.

In optional step 224, the trigger detection system 100 requests update for a supplier detail or other action to remedy the particular triggered opportunity trigger. This is an optional step since not all trigger types require additional information from the supplier entity. Instead some trigger types may require additional information from the buyer entity.

4. Example Implementation of a Trigger Detection System Using a User Interface

Figure 6:
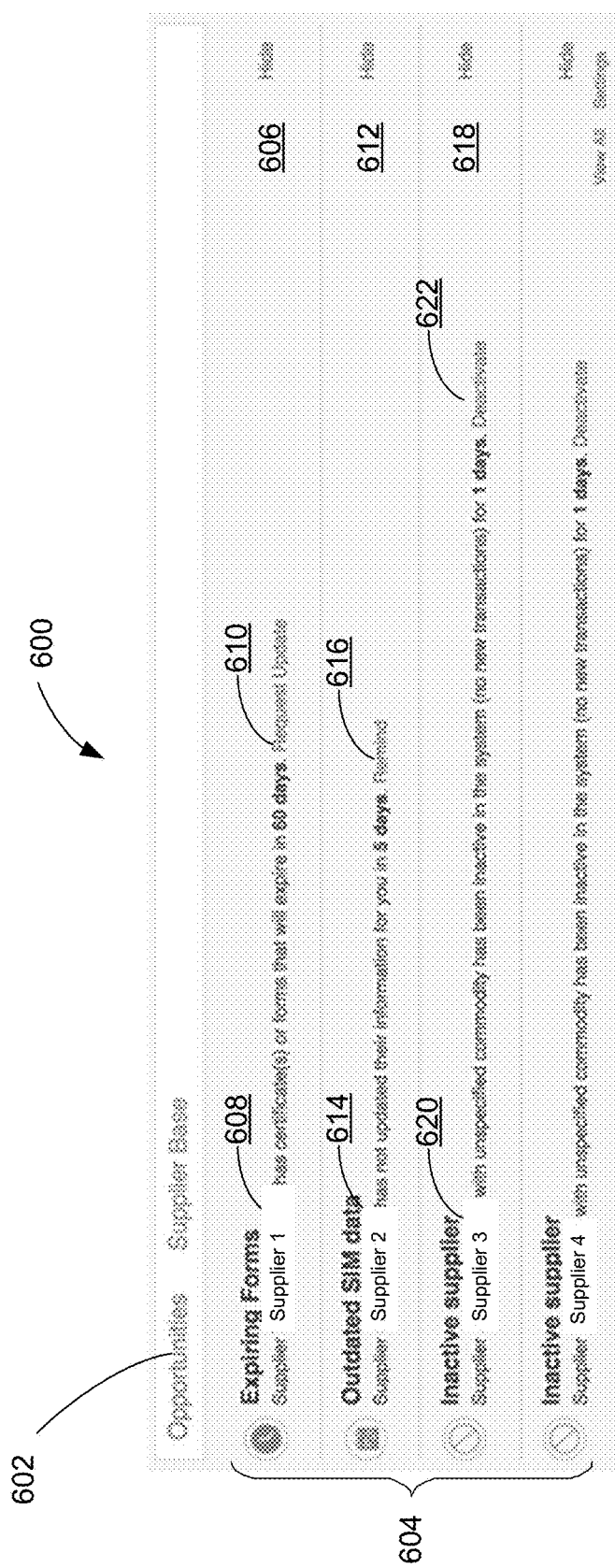
FIG. 6 depicts a display that is configured or programmed for displaying triggered opportunity triggers.
Figure 7:
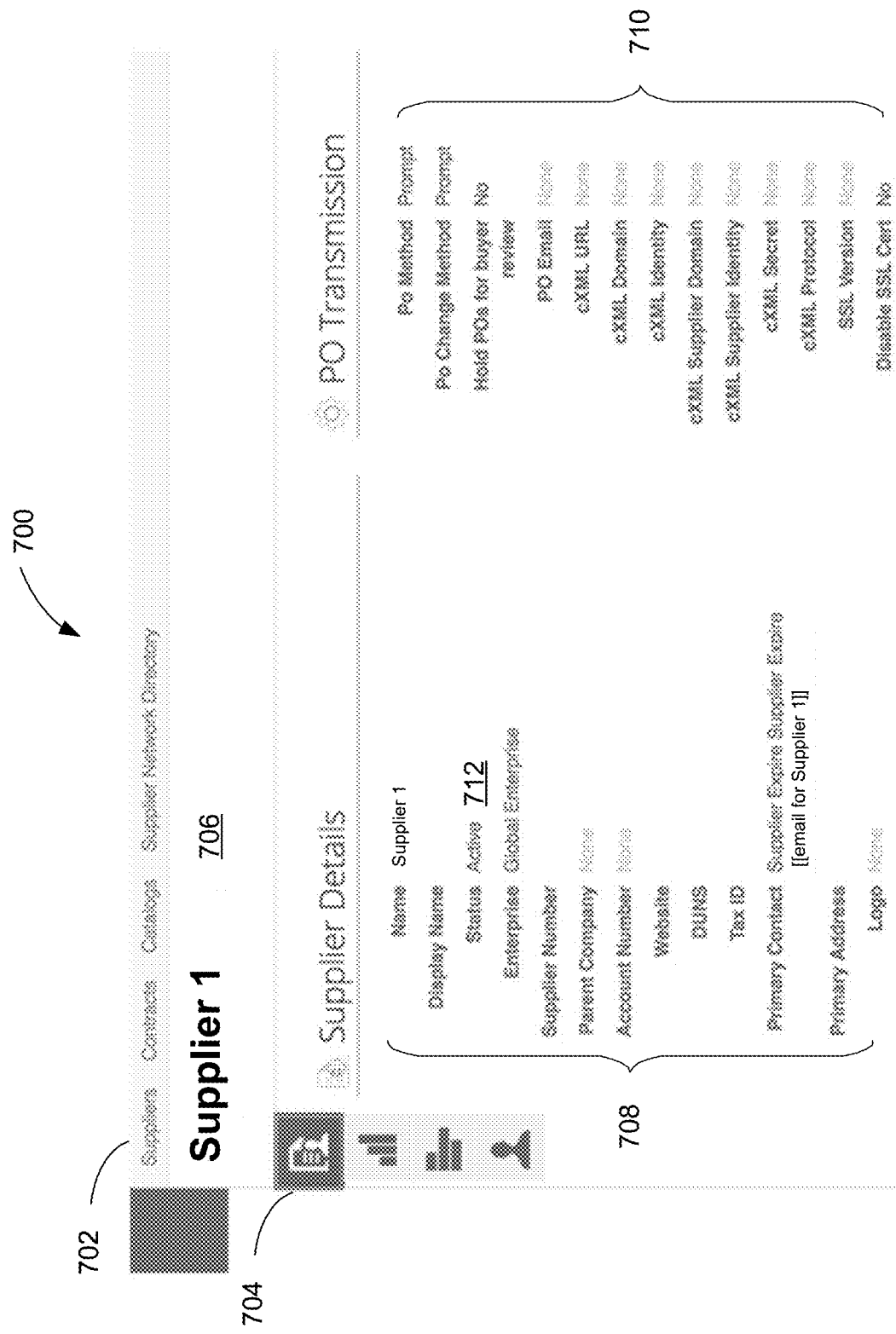
FIG. 7 depicts the trigger detection system interfacing with a procurement system to generate a display for displaying supplier details.
Figure 8:
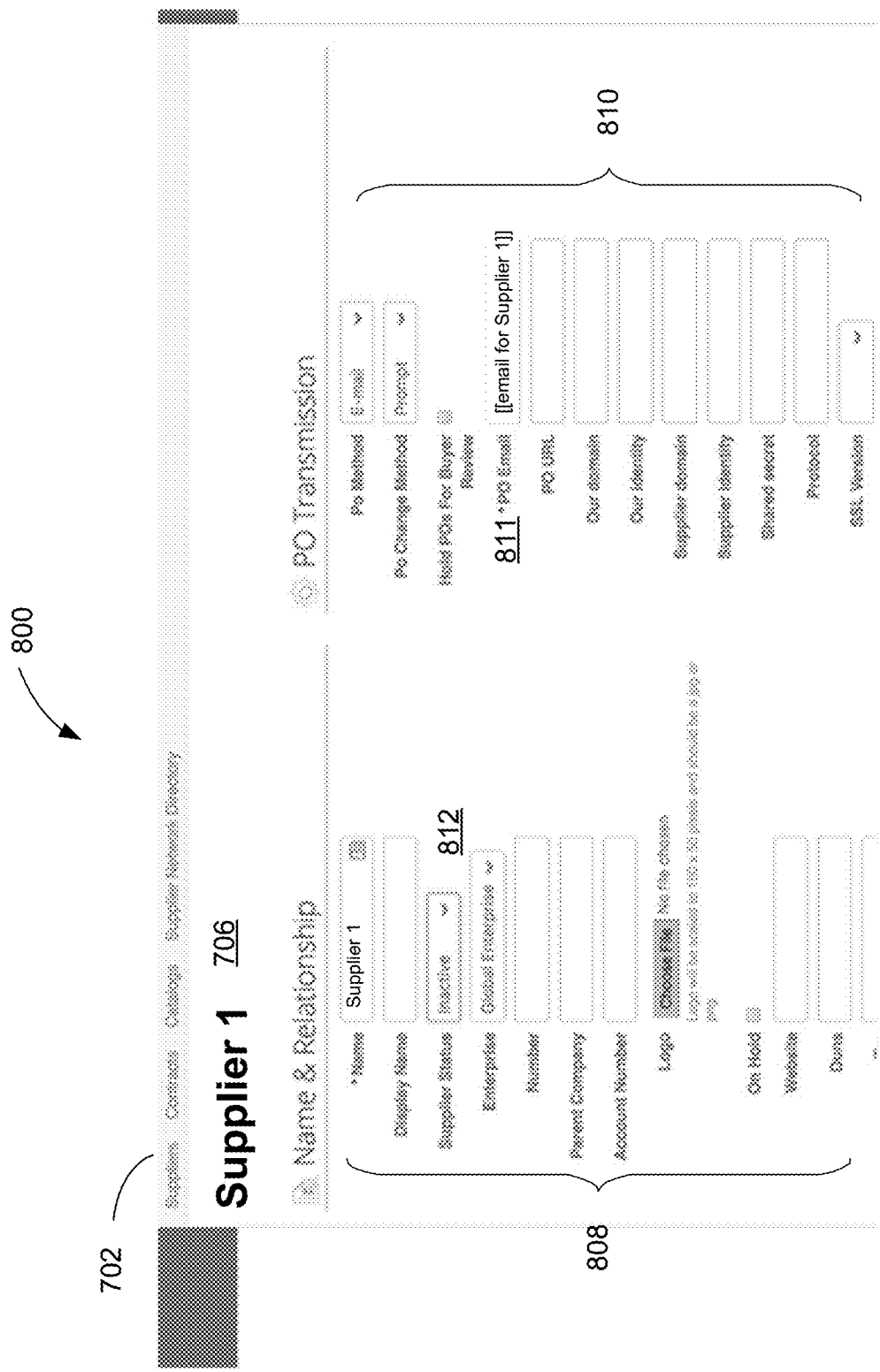
FIG. 8 depicts the trigger detection system interfacing with the procurement system to generate a display for editing supplier details.

FIG. 3, FIG. 4, FIG. 5, FIG. 6, FIG. 7, and FIG. 8 are diagrams of user interface displays that show different screen captures of example functional output of the trigger detection system 100, in an embodiment. The presentation instructions 128 may include code that when executed, cause displaying output of the displays shown in FIG. 3, FIG. 4, FIG. 5, FIG. 6, FIG. 7, and FIG. 8 by implementing the algorithms that are described in other sections herein. FIG. 3, FIG. 4, and FIG. 5 show different screen captures of example output from the trigger detection instructions 116 for generating opportunity triggers. FIG. 6 shows a screen capture of example output from the trigger detection instructions 116 for displaying triggered opportunity triggers. FIG. 7 and FIG. 8 show different screen captures of example output from the trigger detection instructions 116 for remedying triggered opportunity triggers.

Referring to FIG. 3, in an embodiment, the trigger detection system 100 generates a display 300 to input details to create an opportunity trigger of an "inactive supplier" type. The display 300 comprises a trigger type drop-down selector 302, a text box 308 to provide a numerical value to associate with the opportunity trigger, a checkbox 310, and a "Create Trigger" button 312. The trigger type drop-down selector 302 allows selection of one of the types of opportunity triggers supported by the trigger detection system 100. In an embodiment, the trigger types supported by the trigger detection system 100 includes the "inactive supplier" type, an "expiring forms" type, and an "outdated supplier information" type. On FIG. 3, the "inactive supplier" type is selected 306.

The text box 308 accepts a numerical value input to associate with the trigger type. For example, for the "inactive supplier" type, an opportunity trigger would be satisfied when, for a supplier entity, the supplier entity has not had a requisition, purchase order, or invoice created that exceeds the numerical value in number of days. For example, this may indicate that the supplier entity is not been used recently, so that their supplied commodity may require additional review or a follow-up is required to determine why the supplier entity has not been used for an extended period of time.

The checkbox 310, if selected, will mean an opportunity trigger will only be satisfied if the supplier entity is a supplier entity that is a default entity for a commodity. The default supplier for an entity may be specified by information stored in the procurement system 118. Whether an entity is specified as a default supplier for a commodity may be automatically determined by the procurement system 118 (for example, most or a substantial portion of orders for a specific commodity are from a supplier entity) or by manual selection from the buyer entity.

When input for an opportunity trigger has been completed, the "Create Trigger" button 312 is selected and the opportunity trigger information is transmitted to the trigger detection system 100 for monitoring.

Referring to FIG. 4, in an embodiment, the trigger detection system 100 generates a display 400 to input details to create an opportunity trigger of an "expiring forms" type. The display 400 comprises a trigger type drop-down selector 302, a text box 408 to provide a numerical value to associate with the opportunity trigger, a checkbox 310, and a "Create Trigger" button 312. On FIG. 4, the "expiring forms" type is selected 406.

The text box 408 accepts a valid numerical value input to associate with the trigger type. For example, for the "expiring forms" type, an opportunity trigger would be satisfied when, for a supplier entity, the supplier entity has a form in the procurement system 118 that will expire in the numerical value specified in number of days. For example, this may indicate that a form or certificate that provides a guarantee for the quality of the produced commodity is up to a certain standard, or any other type of certification related to procurement is about to expire.

Referring to FIG. 5, in an embodiment, the trigger detection system 100 generates a display 500 to input details to create an opportunity trigger of an "outdated supplier information" type. The display 500 comprises a trigger type drop-down selector 302, a text box 508 to provide a numerical value to associate with the opportunity trigger, a checkbox 310, and a "Create Trigger" button 312. On FIG. 5, the "outdated supplier information" type is selected 506.

The text box 508 accepts a valid numerical value input to associate with the trigger type. For example, for the "outdated supplier information" type, an opportunity trigger would be satisfied when, for a supplier entity, the supplier entity has not submitted a change in the procurement system 118 within the numerical value in number of days. For example, this may indicate that the information is stale or that, at the least, should be reviewed to ensure that the information is still accurate.

Referring to FIG. 6, in an embodiment, the trigger detection system 100 generates a display 600 for displaying triggered opportunity triggers. The display 600 comprises a functions toolbar 602 and a listing of one or more triggered opportunity triggers 604. The functions toolbar 602 allows access to various features of the trigger detection system 100. An "Opportunities" feature of the functions toolbar 602 is currently selected on FIG. 6, which provides a listing of triggered opportunity triggers. A "Supplier Base" feature of the functions toolbar 602 allows access to a supplier list of the trigger detection system 100.

The listing 604 includes a triggered opportunity trigger 606 of the "expiring forms" type for Supplier 1 and associated control 608 and control 610. Control 608 and control 610 provide different ways for a user to remedy the triggered opportunity trigger 606. Control 608 allows a user to review information associated with a supplier, before they take further action to remedy a triggered opportunity trigger. When control 608 is selected, information in the procurement system 108 is presented for Supplier 1. When control 610 is selected, a request to update information is transmitted by the server to a supplier's computer. The request may include instructions and other explanations to a supplier entity, on how to remedy the triggered opportunity trigger.

The listing 604 includes a triggered opportunity trigger 612 of the "outdated SIM data" type for Supplier 2 and associated control 614 and control 616. Control 614 and control 616 provide different ways for a user to remedy the triggered opportunity trigger 612. Control 614 allows a user to review information associated with a supplier, before they take further action to remedy a triggered opportunity trigger. When control 614 is selected, information in the procurement system 108 is presented for Supplier 2. When control 616 is selected, a request to update information is transmitted by the server to a supplier's computer. The request may include instructions and other explanations to a supplier entity, on how to remedy the triggered opportunity trigger.

The listing 604 includes a triggered opportunity trigger 618 of the "inactive supplier" type for Supplier 3 and associated control 620 and control 622. Control 620 and control 622 provide different ways for a user to remedy the triggered opportunity trigger 618. Control 620 allows a user to review information associated with a supplier, before they take further action to remedy a triggered opportunity trigger. When control 620 is selected, information in the procurement system 108 is presented for Supplier 3. When control 622 is selected, control is transferred to the procurement system allowing a buyer user to deactivate a supplier entity from completing additional orders in the procurement system.

Referring to FIG. 7, in an embodiment, the trigger detection system 100 interfaces with the procurement system 108 to generate a display 700 for displaying supplier details. The display 700 comprises a supplier information toolbar 702, a supplier entity name identifier 706, a supplier visualization options toolbar 704, a listing of supplier details 708, and a listing of purchase orders transmitted 710. For example, the display 700 may appear after the selection of control 608 from FIG. 6.

The supplier information toolbar 702 includes links to various features to discover different details about a supplier. The supplier information toolbar 702 comprises links to a "Suppliers" feature, a "Contracts" feature, a "Catalogs" feature, and a "Supplier Network Directory" feature. For example, presently in FIG. 7 the "Suppliers" feature is selected. This feature allows a user access to information stored in a procurement system stored for a specific supplier (for example, Supplier 1). The "Contracts" feature allows a user access to purchase orders or other contracts a buyer has entered into with their supplier entities. The "Catalogs" feature allows a user access to a listing of commodities that a buyer entity is associated with. These commodities may be commodities the buyer entity has previously purchased. The "Supplier Network Directory" feature allows a user to perform a search on one or more supplier details, to see which supplier entities match the one or more supplier details.

The supplier visualization options toolbar 704 includes links to various pieces of supplier details (for example, Supplier 1) presented using different visual formats. The supplier visualization options toolbar 704 comprises icons to access a text format for supplier details, a vertical bar graph format for supplier details, a horizontal bar graph format for supplier details, and a picture summary of supplier details. While in the text format for supplier details as shown in FIG. 7, the supplier details are divided into two listings, the listing of supplier details 708, and the listing of purchase orders transmitted 710. The listing of supplier details 708 include supplier details directed to identification information for a supplier. For example, some of these supplier details include name of the supplier entity, a status of the supplier entity 712, a type of enterprise of the supplier entity (for example, global enterprise, small business, or other type), a supplier number (such as a number used to identify the supplier entity in the procurement system), a parent company, an account number, a website, a Data Universal Numbering System (or DUNS) number for credit reporting purposes, a tax identifier, a primary contact identifier (such as an email address), an address, a logo for the supplier entity, and many other details. The status of the supplier entity 712 may be of either active or inactive status. When a supplier entity is placed into inactive status, the supplier entity may not be used for orders or other transactions in the procurement system by the buyer entity.

The listing of purchase orders transmitted 710 include supplier details related to how to process a purchase order with the supplier entity. For example, some of these supplier details include the purchase order method, whether to hold purchase orders for the buyer entity's review, what email address to transmit a purchase order information, extensible markup language information on where and how to transmit information to the supplier entity's computer, and other supplier details. For example, the extensible markup language information may define a data format for data transmissions from the buyer entity computing device to a supplier entity computing device.

The supplier details stored by the procurement system, such as those listed in the listing of supplier details 708, and the listing of purchase orders transmitted 710 may be used to determine whether one or more opportunity trigger is satisfied. For example, each of the supplier details included in the listing of supplier details 708 and in the listing of purchase orders transmitted 710 may trigger one or more of the trigger types as discussed.

Referring to FIG. 8, in an embodiment, the trigger detection system 100 interfaces with the procurement system 108 to generate a display 800 for editing supplier details. The display 800 comprises the supplier information toolbar 702, the supplier entity name identifier 706, a listing of supplier details 808, and a listing of purchase orders transmitted 810. For example, the display 800 may appear after the selection of control 622 from FIG. 6.

Similar to FIG. 7, FIG. 8 comprises the listing of supplier details 808 and a listing of purchase orders transmitted 810 but in an editable format. For example, various supplier details are now presented in a textbox, drop-down menu, or other suitable user interface element, which allows a buyer or supplier user to modify one or more supplier details as necessary. Some supplier details, if not provided, will result in an error in the procurement system. These supplier details are indicated with an asterisk. For example, for the email supplier detail 811, if while editing a user does not provide a valid email, the procurement system does not allow the supplier entity to be used for orders or other transactions in the procurement system.

The supplier detail for "supplier status" may be modified using the drop-down menu 812. When the "Inactive" status is chosen, the trigger detection system 100 transfers a message to the procurement system, preventing further orders of transactions that include the supplier entity (for example, Supplier 1).

Referring to TAB. 1, in an embodiment, the trigger detection system 100 interfaces with the procurement system 108 to generate the electronic message as shown in TAB. 1 to transmit to a supplier entity. For example, the electronic message may be an email transmitted to the supplier entity, using information stored in the procurement system. The electronic message may be transmitted to a supplier entity after the selection of control 610 or control 616 from FIG. 6.

TABLE 1

Hi Supplier 1,
Buyer 1 wants you to update your profile information for them. It is important that your profile is complete and up to date so your customer has the information they need to transact with you. Get started by registering or logging into the supplier network. Once registered, you can:
1.
- Manage your company information
- Configure your PO transmission preferences
- Create an online catalogue
- View purchase orders
- Create electronic invoices
2. Provide info without registering Thanks!
Buyer 1

The electronic message includes a request for supplier details. The supplier details may be supplier details to update in the procurement system or to create an account to supplement information already stored by the procurement system for the supplier entity. For example, the supplier entity may have included a limited amount of supplier details. The electronic message may prompt the supplier entity, to provide additional supper details or to verify their supplier details.

In an embodiment, the trigger detection system 100 allows a user to review the electronic message (for example, message shown in TAB. 1) before it is sent to a supplier entity. This allows the user to customize the message, before it is transmitted. For example, the user may choose to include pleasantries (for example, "Hope you are well") or other personalization (for example, "We'd like to proceed with orders with you, but need some updated information"), to encourage the supplier entity to timely reply to the request for additional information.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
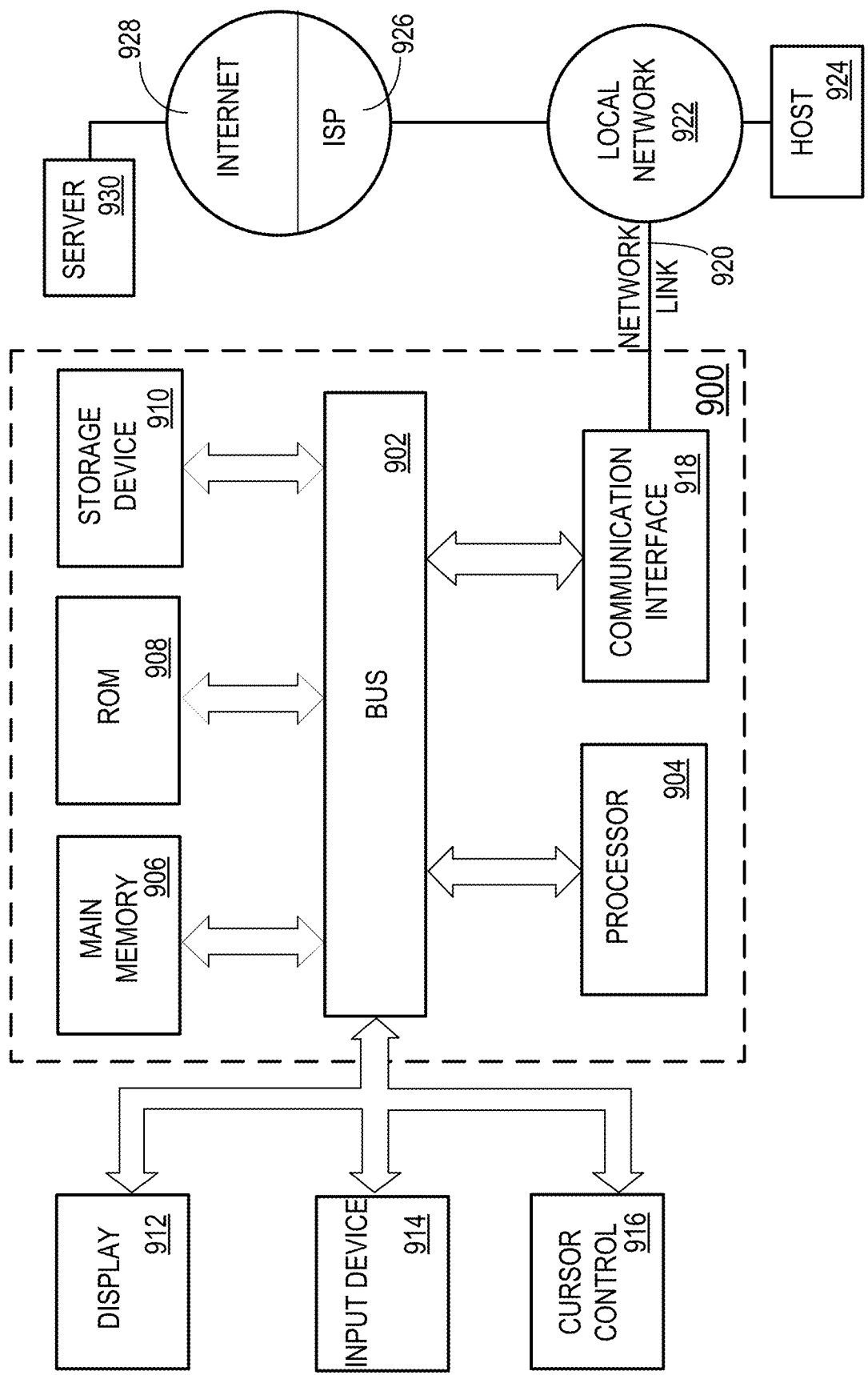
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (for example, x) and a second axis (for example, y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method for a procurement system to resolve an issue with supplier data received from a supplier computer prior to completion of a digital transaction initiated by receipt, by the procurement system, of a request from a buyer computer, the data processing method comprising:

storing, in one or more data repositories, information on a plurality of supplier entities according to a supplier ontology including for each particular supplier entity at least three different supplier attributes comprising a supplier detail, a timestamp specifying at least one of when the supplier detail expires or when the supplier detail was last updated, and an electronic identifier usable to contact the particular supplier entity;

using supplier trigger monitoring instructions of the procurement system executed on a server computer that is coupled to the one or more data repositories, storing a plurality of opportunity triggers each comprising a trigger type and a numeric value;

monitoring, without receiving an explicit request from a computing device, and based at least in part on information from the one or more data repositories, whether one or more of the plurality of opportunity triggers is satisfied, in response to determining, for a particular opportunity trigger and a particular supplier entity, that a timestamp associated with a particular supplier detail that is identified in the opportunity trigger exceeds a time that is determined at least in part by the numeric value associated with that particular opportunity trigger;

creating, based on the monitoring, a first set of triggered opportunity triggers comprising at least one satisfied opportunity trigger;

using a queue data structure, storing the first set of triggered opportunity triggers;

causing displaying, on a computing device, a graphical interface that depicts the first set of triggered opportunity triggers, including a first triggered opportunity trigger indicating that a first supplier entity has satisfied an opportunity trigger, and a supplier name for the first supplier entity, and a set of controls, each control associated with a different executable component of the procurement system that can be initiated to perform a different function to remedy the first triggered opportunity trigger, each different function configured based on a first trigger type of the first triggered opportunity trigger;

receiving a selection of a control and automatically initiating execution of the executable component of the procurement system associated with the control;

under control of the executable component, performing a function to resolve the first triggered opportunity trigger;

cause completion of the digital transaction only if the first triggered opportunity trigger has been resolved.

2. The method of claim 1, further comprising:

causing displaying, on the computing device in the graphical interface, a plurality of different triggered opportunity triggers and a plurality of hyperlinks, wherein each of the hyperlinks is associated with a different corresponding one of the triggered opportunity triggers, and each of the hyperlinks is programmed to access a different executable component of the procurement system that can be initiated to remedy a different particular condition that is associated with the respective triggered opportunity trigger;

receiving input data specifying a selection a particular one of the hyperlinks;

automatically initiating execution of a particular executable component of the procurement system that is associated with the particular one of the hyperlinks that was selected.

3. The method of claim 1, wherein the control comprises a hyperlink controls which, when selected, allow modification of one or more supplier details for one or more of the supplier entities.

4. The method of claim 1, wherein the information on the plurality of supplier entities further comprises historical information for the first supplier entity;
the method further comprising determining whether a first opportunity trigger is satisfied, based on the numerical value associated with the first opportunity trigger and the historical information.

5. The method of claim 4, further comprising displaying in the graphical interface, for the first triggered opportunity trigger, a deactivate control which when selected, blocks the procurement system from accepting new orders to the first supplier entity.

6. The method of claim 4, wherein the historical information comprises information on one of purchase orders, requisitions, or invoices for the first supplier entity.

7. The method of claim 1, wherein the first triggered opportunity trigger further comprises a first supplier detail for a form or a certificate and a second supplier detail for a timestamp specifying a period of validity for the form or the certificate;
further comprising determining a first opportunity trigger is satisfied, based on the numerical value associated with the first opportunity trigger and the timestamp.

8. The method of claim 1, further comprising:
determining, for a first opportunity trigger of the plurality of opportunity triggers, that the first opportunity trigger is satisfied by the first supplier entity and a second supplier entity;
wherein the first set of triggered opportunity triggers includes the first triggered opportunity trigger corresponding to the first supplier entity and a second triggered opportunity trigger corresponding to the second supplier entity.

9. The method of claim 1, wherein the first set of triggered opportunity triggers include the first triggered opportunity trigger of the first trigger type and a second triggered opportunity trigger of a second trigger type and the graphical interface includes the control for the first triggered opportunity trigger, different than one or more controls for the second triggered opportunity trigger, based on the first and second trigger types.

10. The method of claim 1, further comprising displaying, in the graphical interface:
a first type of triggered opportunity trigger based upon determining that information in the one or more data repositories indicates that a particular supplier entity is associated with one or more certificates or forms that will expire within a threshold time;
a second type of triggered opportunity trigger based upon determining that information in the one or more data repositories indicates that a particular supplier entity has not contributed an update to that particular supplier entity's information in the one or more data repositories in greater than a specified number of days; and
a third type of triggered opportunity trigger based upon determining that information in the one or more data repositories indicates that a particular supplier entity is associated with no new transactions in greater than a specified number of days.

11. The method of claim 1, wherein each of the plurality of opportunity triggers are supplier detail specific and supplier agnostic.

12. The method of claim 1, wherein the plurality of opportunity triggers each further specify an applicable commodity and to satisfy an opportunity trigger, a supplier detail associated with a supplier entity corresponds to the applicable commodity.

13. The method of claim 1, further comprising, when the first trigger type corresponds to "expiring," the set of controls comprises a first control configured to perform a "review data" function and a second control configured to perform a "send update request" function; when the first trigger type corresponds to "outdated," the set of controls comprises a third control configured to perform a "send remind request" function; when the first trigger type corresponds to "inactive," the set of controls comprises a fourth control configured to perform a "deactivate" function.

14. A data processing system for a procurement system to resolve an issue with supplier data received from a supplier computer prior to completion of a digital transaction initiated by receipt, by the procurement system, of a request from a buyer computer, the data processing system comprising:
one or more processors;
a non-transitory computer-readable medium having instructions embodied thereon, the instructions, when executed by the one or more processors, cause:
using supplier trigger monitoring instructions of the procurement system executed on a server computer that is coupled to one or more data repositories, storing a plurality of opportunity triggers each comprising a trigger type and a numeric value;
monitoring, without receiving an explicit request from a computing device, and based at least in part on information from the one or more data repositories, whether one or more of the plurality of opportunity triggers is satisfied, in response to determining, for a particular opportunity trigger and a particular supplier entity, that a timestamp associated with a particular supplier detail that is identified in the opportunity trigger exceeds a time that is determined at least in part by the numeric value associated with that particular opportunity trigger;
creating, based on the monitoring, a first set of triggered opportunity triggers comprising at least one satisfied opportunity trigger;
using a queue data structure, storing the first set of triggered opportunity triggers;
causing displaying, on a computing device, a graphical interface that depicts the first set of triggered opportunity triggers, including a first triggered opportunity trigger indicating that a first supplier entity has satisfied an opportunity trigger, and a supplier name for the first supplier entity, and a set of controls, each control associated with a different executable component of the procurement system that can be initiated to perform a different function to remedy the first triggered opportunity trigger, each different function configured based on a first trigger type of the first triggered opportunity trigger;
receiving a selection of a control and automatically initiating execution of the executable component of the procurement system associated with the control;
under control of the executable component, performing a function to resolve the first triggered opportunity trigger;
cause completion of the digital transaction only if the first triggered opportunity trigger has been resolved.

15. The system of claim 14, wherein the instructions, when executed by the one or more processors, further cause:
causing displaying, on the computing device in the graphical interface, a plurality of different triggered opportunity triggers and a plurality of hyperlinks, wherein each of the hyperlinks is associated with a different corresponding one of the triggered opportunity triggers, and each of the hyperlinks is programmed to access a different executable component of the procurement system that can be initiated to remedy a different particular condition that is associated with the respective triggered opportunity trigger;
receiving input data specifying a selection a particular one of the hyperlinks;
automatically initiating execution of a particular executable component of the procurement system that is associated with the particular one of the hyperlinks that was selected.

16. The system of claim 14, wherein the control comprises a hyperlink controls which, when selected, allow modification of one or more supplier details for one or more of the supplier entities.

17. The system of claim 14, wherein the information further comprises historical information for the first supplier entity;
the the instructions, when executed by the one or more processors, further cause determining whether a first opportunity trigger is satisfied, based on the numerical value associated with the first opportunity trigger and the historical information.

18. The system of claim 17, wherein the instructions, when executed by the one or more processors, further cause: displaying in the graphical interface, for the first triggered opportunity trigger, a deactivate control which when selected, blocks the procurement system from accepting new orders to the first supplier entity.

19. The system of claim 14, wherein the instructions, when executed by the one or more processors, further cause: when the first trigger type corresponds to "expiring," the set of controls comprises a first control configured to perform a "review data" function and a second control configured to perform a "send update request" function; when the first trigger type corresponds to "outdated," the set of controls comprises a third control configured to perform a "send remind request" function; when the first trigger type corresponds to "inactive," the set of controls comprises a fourth control configured to perform a "deactivate" function.

20. One or more non-transitory computer-readable media storing instructions for a procurement system to resolve an issue with supplier data received from a supplier computer prior to completion of a digital transaction initiated by receipt, by the procurement system, of a request from a buyer computer, wherein the instructions include:
instructions which, when executed by one or more hardware processors, cause storing, in one or more data repositories, information on a plurality of supplier entities according to a supplier ontology including for each particular supplier entity at least three different supplier attributes comprising a supplier detail, a timestamp specifying at least one of when the supplier detail expires or when the supplier detail was last updated, and an electronic identifier usable to contact the particular supplier entity;
instructions which, when executed by one or more hardware processors, cause using supplier trigger monitoring instructions of a procurement system executed on a server computer that is coupled to the one or more data repositories, storing a plurality of opportunity triggers each comprising a trigger type and a numeric value;
instructions which, when executed by one or more hardware processors, cause monitoring, without receiving an explicit request from a computing device, and based at least in part on information from the one or more data repositories, whether one or more of the plurality of opportunity triggers is satisfied, in response to determining, for a particular opportunity trigger and a particular supplier entity, that a timestamp associated with a particular supplier detail that is identified in the opportunity trigger exceeds a time that is determined at least in part by the numeric value associated with that particular opportunity trigger;
instructions which, when executed by one or more hardware processors, cause creating, based on the monitoring, a first set of triggered opportunity triggers comprising at least one satisfied opportunity trigger;
instructions which, when executed by one or more hardware processors, cause, using a queue data structure, storing the first set of triggered opportunity triggers;
instructions which, when executed by one or more hardware processors, cause displaying, on a computing device, a graphical interface that depicts the first set of triggered opportunity triggers, including a first triggered opportunity trigger indicating that a first supplier entity has satisfied an opportunity trigger, and a supplier name for the first supplier entity, and a set of controls, each control associated with a different executable component of the procurement system that can be initiated to perform a different function to remedy the first triggered opportunity trigger, each different function configured based on a first trigger type of the first triggered opportunity trigger;
instructions which, when executed by one or more hardware processors, cause receiving a selection of a control and automatically initiating execution of the executable component of the procurement system associated with the control;
instructions which, when executed by one or more hardware processors, cause, under control of the executable component, performing a function to resolve the first triggered opportunity trigger;
instructions which, when executed by one or more hardware processors, cause completion of the digital transaction only if the first triggered opportunity trigger has been resolved.

21. The one or more non-transitory computer-readable media storing instructions of claim 20, wherein each of the plurality of opportunity triggers are supplier detail specific and supplier agnostic.

22. The one or more non-transitory computer-readable media storing instructions of claim 20, wherein the plurality of opportunity triggers each further specify an applicable commodity and to satisfy an opportunity trigger, a supplier detail associated with a supplier entity corresponds to the applicable commodity.

23. The one or more non-transitory computer-readable media storing instructions of claim 20, further comprising instructions which, when executed by one or more hardware processors, cause, when the first trigger type corresponds to "expiring," the set of controls comprises a first control configured to perform a "review data" function and a second control configured to perform a "send update request" function; when the first trigger type corresponds to "outdated," the set of controls comprises a third control configured to perform a "send remind request" function; when the first trigger type corresponds to "inactive," the set of controls comprises a fourth control configured to perform a "deactivate" function.

\* \* \* \* \*